June 2, 1942. E. C. HORTON 2,284,963
VEHICLE DIRECTION INDICATOR
Filed Aug. 17, 1939 3 Sheets-Sheet 1
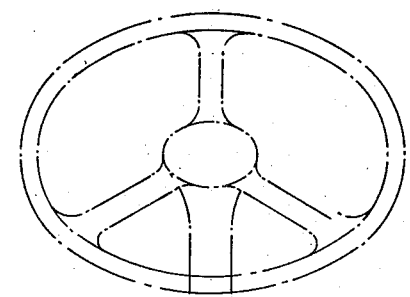
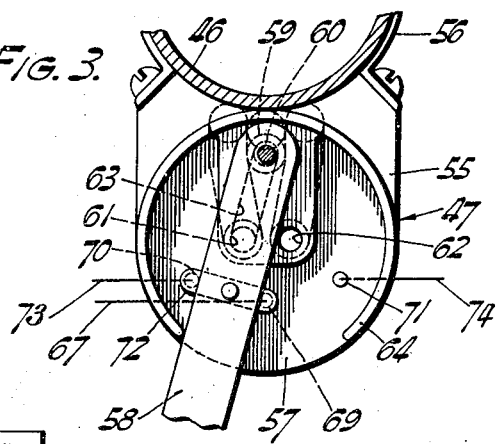
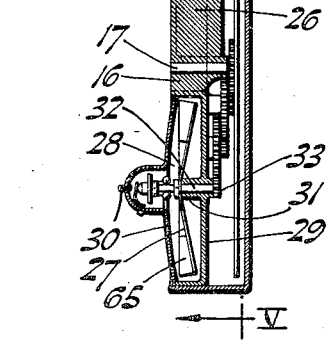
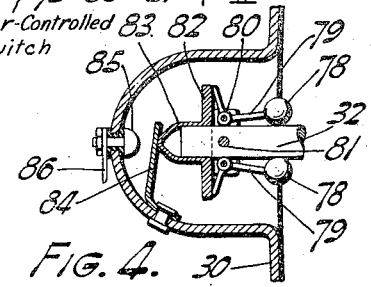
INVENTOR
*Erwin C. Horton,*
BY
*Beau, Brooks, Buckley & Beau.*
ATTORNEYS INVENTOR
Erwin C. Horton,
BY
Beau, Brooks, Buckley & Beau.
ATTORNEYS

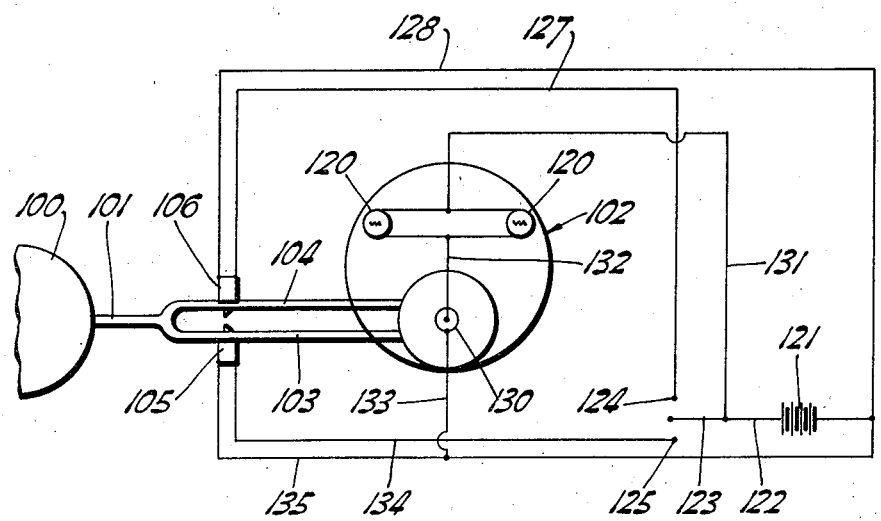
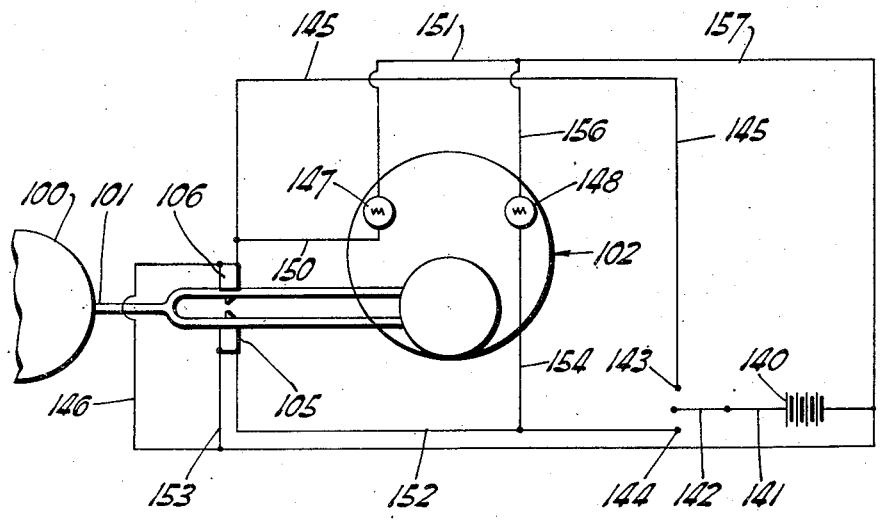

Patented June 2, 1942

2,284,963

UNITED STATES PATENT OFFICE 2,284,963

VEHICLE DIRECTION INDICATOR

Erwin C. Horton, Hamburg, N. Y., assignor to Trico Products Corporation, Buffalo, N. Y.

Application August 17, 1939, Serial No. 290,649

8 Claims. (Cl. 177—337)

This invention relates to direction indicators and particularly to direction indicators for use in visually indicating an intention on the part of the operator to change the direction of a vehicle.

Many forms of vehicle direction indicators have been heretofore proposed but the device of the present invention operates in a novel manner and is believed to present a more graphic and attention arresting indication or signal than the devices of the prior art. According to the principles of the present invention the visual signal gives the impression to the observer of a light source which is constantly progressing in the direction in which the turn is to be made. This impression of light progression continues as long as the signal is illuminated, that is, for as long a period as the device is designed to remain operative before the turn is actually made.

The device of the present invention may conveniently be adapted to use in connection with a vehicle having an internal combustion propelling engine and when so used its motivating energy may be the pressure differential obtaining between the interior of the intake manifold of the engine and the atmosphere. A manual control within convenient reach of the operator for selectively operating the device to indicate turns in either direction is preferably provided and in the specific embodiments illustrated such control may be effected either directly by valve means or by means of electrical devices for actuating remotely located valve means.

While in the illustrated embodiments the devices are shown as being arranged for manual initiation and discontinuance, any of the known forms of resetting or unsetting devices for apparatus of this character may be availed of. Some of these devices embody time delay mechanism for automatically neutralizing a manually initiated signal while others are neutralized by the actual execution or completion of the turn through connection with the steering mechanism.

While several specific forms which are exemplary of the principles of my invention have been illustrated in the accompanying drawings and described in the ensuing specification, it is to be understood that the invention is not limited save as defined in the appended claims.

In the drawings:

Fig. 1 is a somewhat diagrammatic elevational view of apparatus comprising one form of my invention;

Fig. 2 is a cross sectional view taken approximately on the line II—II of Fig. 1;

Fig. 3 is a top plan view of manual control means associated with a vehicle steering post and with the cover member thereof removed;

Fig. 4 is an enlarged cross sectional view of a portion of the mechanism appearing on a smaller scale in Fig. 2 and viewed in the same manner as in Fig. 2;

Fig. 6 is a diagrammatic view of one form of electrical control means for a signal element constructed in accordance with the principles of the present invention;

Fig. 7 is a diagrammatic view of another form of electrical control means for such signal element; and, Fig. 8 is a detailed cross sectional view of the electromagnetically controlled valve arrangement of the modifications of Figs. 6 and 7.

Figure 5:
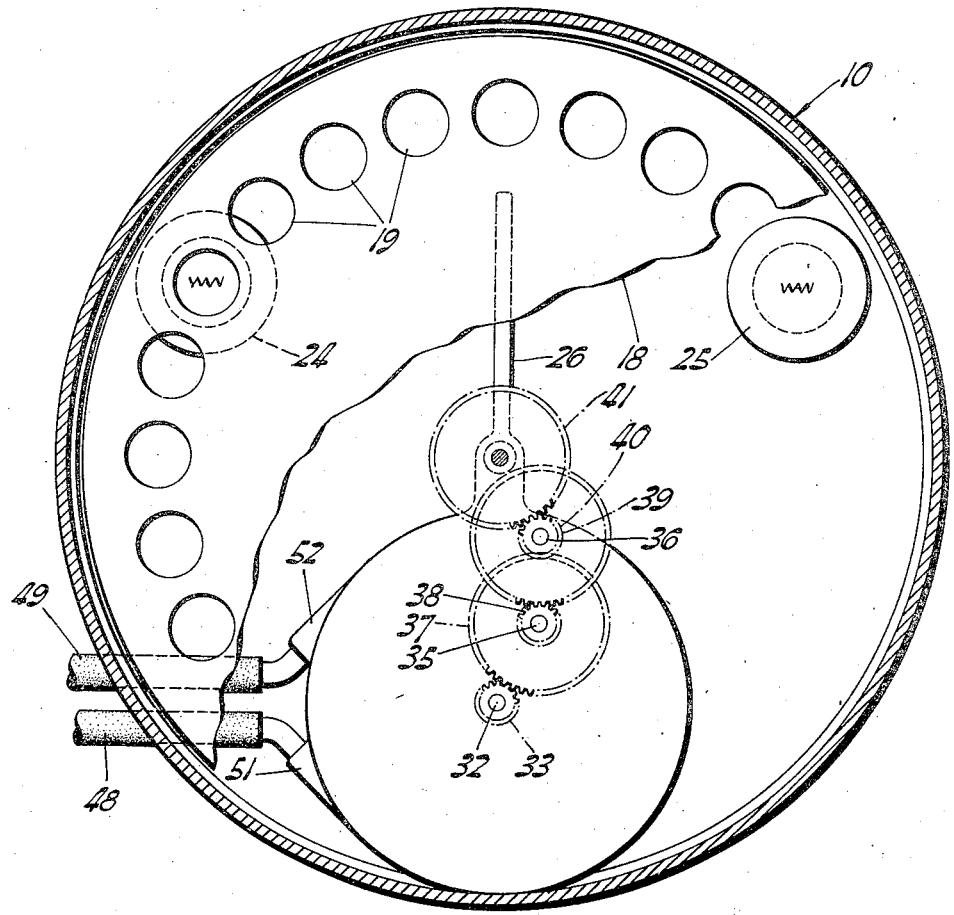
Fig. 5 is an enlarged cross sectional view taken approximately on the line V—V of Fig. 2 with portions broken away.

In the drawings like characters of reference denote like parts and the numeral 10 designates generally a casing which is mounted in a position on the vehicle where it may be seen from the exterior thereof. Turn signals are conventionally mounted exteriorly and at the rear of the vehicle but such signals are often mounted at the front of a vehicle or in the interior thereof in such position as to be seen from the outside and if desired several duplicate casings may be provided, either front and rear of the vehicle or at such other plural points as may be considered to render the signal visible from a greater number of vantage points.

The form of signal casing which appears in elevation in Fig. 1 and in vertical cross section in Fig. 2 comprises a housing which may be circular in form and relatively flat. In the illustrated instance the housing is made up of a pair of elements 12 and 13 which comprise circular plates having interfitting annular flanges 14 and 15 respectively. One of the elements, in the present instance that designated 12, carries a central bearing element 16 which is provided with a pin 17 for rotatably supporting a flat disc 18 which is disposed in relatively close proximity to the interior wall of the casing element 13. The rotatable disc 18 is provided about its outer margin with a continuous series of circularly aligned openings 19 for a purpose which will hereinafter appear.

An arcuate opening 20 is formed in the face of the casing element 13 and to prevent the admission of dirt and other foreign matter into the casing this opening 20 is preferably closed by a pane 21 of glass, Celluloid, or any satisfactory transparent or translucent material which may, if desired, comprise a color filter for emitting red light or light of some other distinguishing color. While the arcuate opening may assume various dimensions, and may in fact comprise several related openings, the embodiment of Figs. 1 and 2 discloses an opening which is nearly semicircular in its extent and which occupies approximately the upper half of the face of the casing portion 13. If desired, the ends of the arcuate opening may consist of arrowheads as illustrated.

Still referring to the form of signal casing contemplated in Figs. 1 and 2, a pair of lamps 24 and 25 are positioned in the casing and preferably against the inner wall of the casing portion 12. In the embodiment now being described one lamp 24 is disposed behind the left-hand arrowhead as seen in Fig. 1 and the other lamp 25 is disposed behind the right-hand arrowhead. The lamps 24 and 25 are adapted to be selectively illuminated in a manner and for a purpose which will hereinafter appear.

In the form of signal now under consideration a partial light-confining partition 26 is provided which extends from the central portion of the casing vertically upwardly to approximately the lower edge of the arcuate slot 20. The partition may alternatively be a full one, extending to the upper rim of the casing 10, or it may be omitted entirely with resulting minor alterations in the resulting signal indication. The variations in the signal which result from these modifications will be hereinafter discussed in greater particularity.

The lower half of the casing 11 houses a turbine rotor 27. A suitable turbine chamber 28 may be provided by forming a cup-shaped depression 29 in the casing portion 12 and providing such depression with a closure or cover member 30. A bearing 31 may be formed in the depression 29 for supporting a turbine shaft 32. The turbine rotor is positioned upon the turbine shaft adjacent one face of the bearing 31 and upon the opposite side of the bearing a pinion 33 is fixed to the shaft 32. The pinion 33 drives the disc 18 through the intervention of suitable intermediate gearing, usually for causing the disc 18 to rotate at a relatively slower speed than the comparatively high speed turbine rotor.

The intermediate gearing between the turbine shaft 32 and the rotatable disc 18 may be arranged as shown in Fig. 5 wherein the numerals 35 and 36 designate stub shafts which rotatably support pairs of gears 37, 38 and 39, 40 respectively. The gears 37 and 38 are fixed for joint rotation as are the gears 39 and 40. A gear 41 is fixed for rotation with the disc 18 and rotation of the latter by rotation of the turbine rotor 27 is accomplished through the gearing 33, 37, 38, 39, 40 and 41.

In the illustrated instance the gearing is such that the speed of the disc 18 would be materially less than the speed of the turbine rotor 27 but the ratio between these two elements would depend upon two factors, namely, the normal operating speed of the particular turbine employed and the desired speed of operation of the disc 18, and consequently the driving ratio between the two might be varied between relatively wide limits without departing from the principles of the present invention.

I shall now discuss the preferred mode of transmitting operating fluid to the turbine and an effective method of controlling and directing such transmission in order that operation of the turbine in either direction may be readily and selectively effected. In the form of my invention illustrated in Fig. 1, speaking generally, a conduit 43 leads from a source of differential fluid pressure which may be the intake manifold 44 of the internal combustion propelling engine 45 of an automotive vehicle, wherein subatmospheric pressure normally exists during operation. The conduit 43 leads to a convenient point within reach of the operator of the vehicle, in the illustrated instance the steering column 46 of the vehicle, where it communicates with control means designated generally 47.

The control means 47 of Figs. 1 and 4 is arranged to alternatively direct motivating fluid pressure into either of two branch conduits 48 and 49 leading to the turbine chamber 28. The conduits 48 and 49 terminate respectively in oppositely directed operating jets 51 and 52 for rotating the turbine rotor 27 in either direction depending upon which of the conduits 48 or 49 is connected with the conduit 43 by means of the control means 47. The control means may be so arranged as to vent to the atmosphere the one of the conduits 48, 49 which is not connected to the suction conduit 43.

Giving attention to the specific arrangement of the control means and fluid conduits and jets disclosed in Figs. 1 and 3, a bracket 55 is secured to the steering column 46 by means of a strap 56 and the bracket is provided with a valve seating face 57. A valve lever 58 is pivotally mounted against the valve seating face 57 by means of a hollow fulcrum pin 59. The conduit 43 is connected with the fulcrum pin 59 or associated means at the under side of the bracket 55 and the partial vacuum existing in the intake manifold 44 is communicated to the valve seating face through the conduit 43 and the central opening 60 of the fulcrum pin 59.

A pair of ports 61 and 62 are provided in the valve seating face 57 and are arranged to communicate with the conduits 48 and 49 respectively and the under face of the lever 58, the face which seats against the valve seating surface 57 of the bracket 55, is provided with a groove 63 which extends therealong from the fulcrum point to a point sufficiently spaced therefrom to establish communication between the port 60 and either of the ports 61 or 62, depending upon the angular position of the lever 58. An interrupted flange 64 may be formed about the face 57 to provide motion limiting means for the lever 58 and to cooperate with a cover member for this mechanism, the cover member not being illustrated.

In the position shown in Fig. 3 the lever is in its left-hand position and fluid communication is established between the interior of the engine manifold 44 and the operating jet 51 through the conduit 43, the port 60, the groove 63, the port 61 and the conduit 48. At the same time the port 62 is in free communication with the atmosphere and this condition establishes atmospheric communication for the turbine chamber 28 through the conduit 49 and the jet 52.

With the valve lever set in this position the turbine chamber 28 will tend to become evacuated by reason of its connection with the intake manifold 44 but this tendency will be counteracted by an inrush of air at the jet 52 by virtue of its atmospheric connection through the conduit 49 and the port 62. The air entering at the jet 52 impinges upon impellers 65 formed upon the turbine rotor 27 and causes rotation thereof in a clockwise direction as viewed in Fig. 1.

Clockwise rotation of the turbine rotor 26, through the intermediate gearing previously referred to, causes counterclockwise rotation of the disc 18 which is the desired rotation for indicating a left-hand turn. The manner in which the rotation of the disc 18 cooperates in indicating an intention to turn will be hereinafter discussed in detail.

When the disc 18 is rotating in a counterclockwise direction to indicate a left-hand turn it is desired, in the embodiment now being discussed, that the left-hand lamp 24 be illuminated, and to this end a lamp circuit is provided having switch means incorporated with the manual control valve situated on the steering column of the vehicle.

An electrical conductor 67 leads from one terminal of the electric storage battery 68 of the vehicle, the other terminal thereof being grounded in the conventional manner, and the conductor 67 may terminate in a contact element 69 disposed in the face of the valve seat 57, and preferably centrally thereof as in Fig. 4. Contact elements 70 and 71 are provided in the valve seating face 57 to the left and right of the contact element 69 and all three contact elements are insulated from the valve seating face and the bracket 55 in a conventional manner.

A bridge piece or conductor strip 72 is disposed in the lower face of the valve lever 58 and insulated from the rest of the lever in any convenient manner. It will be noted that with the parts in the position illustrated in Fig. 3 the bridge piece overlies the left-hand contact 70 and the central contact 69. The left-hand contact 70 has a conductor 73 leading to one terminal of the lamp 24 and the right-hand contact 71 has a conductor 74 leading to one terminal of the lamp 25. Consequently in the position shown one terminal of the lamp 24 will be in electrical communication with the battery 68.

As shown in Fig. 1 the remaining terminal of each of the lamps 24 and 25 is grounded and if convenient, a common ground connection may be utilized for both lamps. In one of the preferred constructions a switch 75 is disposed in the conductor which leads to the ground for both of the lamps and this switch is so arranged as to be common to both lamps 24 and 25. Alternatively, the switch 75 may be disposed in the common conductor 67 leading from the battery to the steering post if such arrangement be found desirable. The switch 75 is diagrammatically illustrated in Fig. 1, but, as shown in Fig. 2, actually comprises automatic switch means under the control of a governor mechanism which is associated with the turbine shaft 32.

An exemplary form of governor mechanism is illustrated on an enlarged scale in Fig. 4 and comprises a plurality of flyballs 78 each disposed at one end of a bell crank 79. The several bell cranks 79 are pivotally supported by a split collar 80 which is fixed to the turbine shaft 32 as by a pin 81. The opposite leg of each bell crank 79 bears against a flange 82 formed upon a sleeve 83 which fits over the end of the turbine shaft 32. A resilient switch arm 84 is anchored so that its outer free end bears against the outer end of the sleeve 83 and normally holds the sleeve inwardly upon the turbine shaft 28 and consequently resiliently holds the several bell cranks 79 in the position illustrated in Fig. 4.

An electrical contact element 85 is disposed against the inner wall of the turbine chamber cover 30 in proximity to the free end of the resilient switch arm 84 and is suitably insulated from its supporting structure. The contact member is connected to a common ground conductor 86 leading from the lamps 24 and 25 and the resilient metallic switch arm 84 is connected directly to the metallic cover member 30 and it will be clear that movement of the switch arm 83 away from the end of the turbine shaft 32 in an axial direction will cause the contact members 84 and 85 to come into electrical contact.

By such contact the ground wire 86 is grounded to the indicator casing through the switch arm 84 and it will therefore be clear that upon pivotal movement of the bell cranks 79 caused by centrifugal force urging the flyballs 78 away from the turbine shaft 32 that both of the lamps 24 and 25 will be connected to ground. This results in illumination of whichever lamp has communication with the storage battery by virtue of the position of the valve lever 58, and in the instance which is being described, the left-hand lamp will be illuminated.

It will be noted that movement of the lever 58 and consequent engagement of one of the contacts 70 or 71 with the contact 68 of the battery lead 67, in the embodiment now being described, merely sets up the proper lamp circuit and that such circuit is not completed from battery to ground until rotation of the turbine shaft 32 is at sufficient speed to cause closing of the switch formed by the contacts 84 and 85. Conversely, the activated lamp circuit will be automatically broken as soon as the speed of the turbine shaft 32 falls below a predetermined minimum which is regulated by the tension in the resilient arm 84 and the proportioning of the several associated parts of the automatic switch governor.

The operation of the modification which has thus far been described is as follows. When the operator of a vehicle equipped with the device of my invention decides to execute either a left or a right turn, he moves the control lever 58 into either its left- or its right-hand position, his choice of position corresponding with the direction of the turn to be executed. Movement of the lever 58 into either of these positions effects the necessary fluid connections for producing clockwise rotation of the disc 18 if a right turn is to be made and counterclockwise rotation of the disc if a left turn is to be made.

Simultaneously with the activation of the disc 18 the electrical circuit from the battery to one of the lamps 24, 25 is completed; the left-hand lamp 24 if the rotation of the disc is counterclockwise, and the right-hand lamp 25 if the rotation of the disc is clockwise. At this point in the operation the lamp circuit is not completely closed, however, since the governor controlled switch 84, 85 is not closed until the rotation of the disc 18 reaches a given speed. When such speed is reached the closure of the switch 84, 85 grounds whichever lamp circuit is made by the valve lever 58 and thus completes an electrical circuit through that lamp.

With the left-hand lamp 24 illuminated and the disc 18 rotating in a counterclockwise direction the visual aspect of the signal is such as to indicate a left turn without any previous apprisement on the part of the observer as to the meaning of the signal. The continuous series of openings 19 pass from right to left along the arcuate opening 20 and, due to the location of the lamp 24 in close proximity to the left-hand end of the arcuate opening 20, the relatively remote openings which become visible at the right-hand end of the arcuate opening 20 are comparatively dimly illuminated.

As each of the individual openings 19 moves toward the left-hand side of the arcuate opening and consequently toward the lighted lamp 24, it becomes more brightly illuminated and it reaches its peak of illumination just before it leaves the left-hand end of the opening and again becomes invisible. The resulting visual phenomenon is of a curved streak of light, more brightly illuminated at its left-hand end and giving the impression of constant motion toward the left even though the actual position of the arcuate opening remains unchanged.

In the illustration so far described the arcuate opening is shown as terminating at each end in an arrowhead and when the opening is so formed the arrowhead which is at the left end, assuming that the left-hand lamp 24 is illuminated, will be relatively much more brightly illuminated than the arrowhead at the right-hand end of the arcuate opening, and consequently the predominating impression conveyed to the observer is a signal of an intention to make a left turn.

In the form thus far described the partition 26 serves to assist in localization or concentration of the illumination at the left end of the opening when a left turn is contemplated and the right end of the opening when a right turn is contemplated. The partition 26 may be omitted entirely and the mere placement of the lamps may be relied upon for distributing the intensity of illumination in the desired manner or, on the other hand, the partition may be arranged to extend to the top of the casing and provide separate chambers for the lamps 24 and 25, in which event each signal indication will only illuminate half of the arcuate opening, the left-hand half for left turns and the right-hand half for right turns.

In Figs. 6 and 7 I have illustrated modifications of my invention wherein electrical means are provided for controlling, from the vehicle operator's position, remotely located valve means which may be associated directly with the casing of the signal itself. In these modifications the mechanical construction of the mechanism within the signal casing may be the same as in the previously described embodiment and for this reason Figs. 6 and 7 are diagrammatic.

The arrangement of the fluid pressure lines and the valve control means therefor are common to the modifications of Figs. 6 and 7 and for this reason they may be described simultaneously up to a certain point. In each case the numeral 100 designates the internal combustion engine intake manifold and the fluid conduit extending therefrom is shown at 101. Signal casings similar in mechanical construction to the casing 10 previously described are shown at 102 and adjacent such casings the fluid conduits 101 diverge to form a pair of operating conduits 103 and 104 which correspond in function to the conduits 48 and 49 respectively of the previously described modification.

Figure 8:
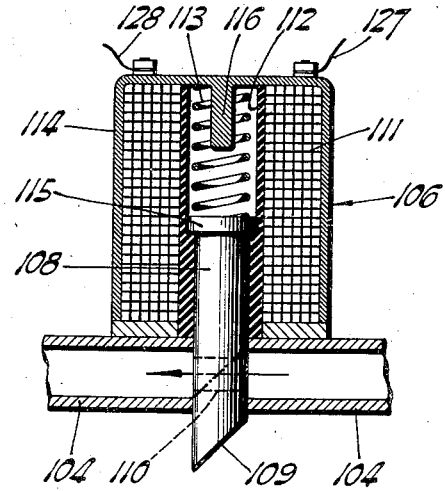

Electrically controlled valve means for the conduits 103 and 104 are shown at 105 and 106 respectively in both Figs. 6 and 7 and one such means 106 is illustrated in greater detail in Fig. 8. Referring to Fig. 8, the conduit branch 104 is provided with a transverse opening which extends therethrough and receives a valve member 108 having an angularly formed terminal portion 109 and an opening 110 extending therethrough and so disposed as to form a continuation of the conduit 104 when in its illustrated full line position.

In other words, in this position the valve 108 is ineffective and the conduit 104 is uninterrupted. When the valve 108 is in this position the interior of the casing 102 communicates equally through both of its turbine jets with the pressure conduit 101 and no action of the turbine takes place.

An electromagnet 111 for controlling movements of each of the valves 108 is provided and such electromagnet may have a hollow core 112 of insulating material for receiving the valve member 108 which latter is adapted to be attracted to within the opening by energization of the electro-magnet. Normal disposition of the valve in its full line illustrated position is insured by the provision of a coil spring 113 which is disposed between the upper end of the valve member, as illustrated in Fig. 8, and the inside of the top of a casing 114 which is associated with the electromagnet 111.

To limit outward movement of the valve 108 with respect to the electromagnet 111 a flange 115 is formed upon the former for engagement with a shoulder formed by a reduction in the diameter of the opening in the hollow core 112. To definitely limit inward movement of the valve 108 with respect to the electromagnet (upward movement as viewed in Fig. 8) a projection 116 is formed on the casing 114 and engages the end of the valve 108 when the latter is attracted by the electromagnet so that the terminal portion 109 assumes the position indicated in dot and dash lines on Fig. 8.

When the valve 108 is in such retracted position the left-hand portion of the conduit 104, as seen in Fig. 8, is closed off by the lower portion of the valve stem and the right-hand portion of the conduit 104, as seen in that figure, is opened to the atmosphere. The left-hand portion of the conduit leads to the main pressure conduit 101 while the right-hand portion leads to an associated jet in the turbine chamber, analogous to the jet 52 of the first described embodiment.

It will therefore appear that when the electromagnet 111 is energized to move the valve 108 to retracted position, all of the pressure differential in the main conduit 101 will be directed through the other of the branch conduits, namely, 103, with the result that the turbine chamber tends to become evacuated through the conduit 103 while air rushes in to the right-hand portion of the conduit 104, which is now open to the atmosphere, and through its associated jet into the turbine chamber, turning the turbine rotor.

I shall now describe the electrical circuits which are provided in the modification of Fig. 6 for suitably and selectively energizing the electromagnets 105 and 106 and a pair of lamps 120. The vehicle storage battery is indicated at 121 and a conductor 122 leads therefrom to a three-position switch 123. This switch is shown in Fig. 6 in neutral, open-circuit position but may be selectively moved to engage either of a pair of contacts 124 and 125.

When the switch is moved to engage the contact element 124 it closes the circuit through the electromagnet 106 by means of a conductor 127 which leads from the contact member 124 to one terminal of the electromagnet 106, and a conductor 128 which leads from the other terminal of the electromagnet 106 back to the opposite side of the storage battery, or as is more conventional, to a suitable ground.

With such closing of the energizing circuit for the electromagnet 106, the condition just described in connection with the detailed description of the electromagnetically controlled valve mechanism of Fig. 8 is brought about with the result that the turbine is rotated in a clockwise direction as seen in Fig. 6, with resultant counterclockwise rotation of the associated indicating disc, and a left turn is indicated.

A governor controlled switch similar in construction to the switch shown in Fig. 4 and described in connection with the embodiment of Figs. 1 through 4 is provided as at 130 and is disposed in an otherwise permanently closed circuit for the lamps 120, such circuit comprising a conductor 131 leading from one side of the battery to the lamps 120, which are connected in parallel, a conductor 132 from the pair of lamps 120 to the governor controlled switch 130, and a conductor 133 which leads from the switch 130 to the opposite side of the battery or to a conventional ground.

For indicating a right-hand turn it will be apparent that the switch 123 is moved to engage the contact 125 which completes a circuit for the electromagnet 105 through a conductor 134 leading from the switch contact 125 to one terminal of the electromagnet 105, and a conductor 135 from the other terminal of the electromagnet 105 back to the opposite side of the battery or to ground.

It will be noted that in the embodiment of Fig. 6 both lamps 120 are simultaneously energized each time the turbine reaches a speed sufficient to close the governor controlled switch 130, regardless of the direction of turn which is being indicated. In such case the arcuate slot of the signal casing is substantially uniformly illuminated, or at least, the opposite ends of the slot will appear illuminated in equal degree. It will appear from this that the concentration of illumination referred to and set forth in detail in connection with the first described embodiment is not essential to operation of my invention since the direction of movement of the openings in the indicating disc as they move along the arcuate slot in either direction is sufficiently graphic to apprise observers of the intended direction of turn. Obviously, the necessity or desirability of a partition of any kind between the lamps 120 is not present when both lamps are arranged for simultaneous illumination.

I refer now to the further modification of electrical control means for the electromagnetically controlled valve means 105 and 106 which is illustrated in Fig. 7. In this embodiment there is provided, as in the previous embodiment, an electric storage battery 140 and a conductor 141 leading from one side thereof to a three-position switch 142 which is shown in neutral position but may be moved to engage either of a pair of contacts 143, 144.

The contact 143 has associated therewith a conductor 145 leading to one side of the electromagnet 106 and a conductor 146 leads from the opposite side of the electromagnet 106 to the opposite side of the storage battery 140 or to ground. A pair of lamps 147 and 148 is provided and the lamp 147 is connected in parallel with the electromagnet 106 by means of a conductor 150 which extends between the conductor 145 and one terminal of the lamp, and a conductor 151 which extends from the opposite terminal of the lamp to the battery to complete the circuit or to ground.

When the switch 142 is moved to establish electrical communication between the battery and the contact 144, a circuit is completed through the other electromagnetically controlled valve means 105 through a conductor 152 leading from the contact 144 to one terminal of the electromagnet 105, and a conductor 153 which leads from the opposite terminal of the electromagnet 105 back to the battery or to ground. The lamp 148 is connected in parallel with the electromagnet 105 by means of a conductor 154 which engages between the conductor 152 and one terminal of the lamp 148, and a conductor 155 which leads from the other terminal of the lamp 148 back to the battery or to ground.

In Fig. 7 the conductor 155 is shown connected to the conductor 151 from the other lamp 147 and a common battery return or ground wire 157 is provided. While the governor controlled switch for the lamp circuits which has been described in connection with the two previous embodiments is not shown incorporated in the embodiment of Fig. 7, and while its use is not necessary to satisfactory operation of the signal in any event, the advantages to be derived from its use may be availed of or not as desired in connection with the apparatus of any of the embodiments herein shown and described. If such governor controlled switch is to be employed in connection with the embodiment of Fig. 7, it may conveniently be interposed in series with the conductor 157 which comprises a common battery return for both lamps 147 and 148, or, alternatively, a common ground conductor.

I claim:

1. In a vehicle direction indicator, a rotatable member having a plurality of apertures therein, illuminating means behind said member and adapted to cast light rays through said apertures, means for selectively rotating said member in either direction to warn observers of an intention to turn in the indicated direction, and automatic speed-responsive means for rendering said illuminating means operative upon rotation of said rotatable member above a predetermined minimum velocity.

2. In a vehicle direction indicator, a rotatable member having a plurality of apertures therein, spaced illuminating elements behind said member and adapted to cast light rays through said apertures, means for selectively rotating said member in either direction to warn observers of an intention to turn in the indicated direction, and automatic speed responsive means for rendering a selected one of said illuminating elements operative upon rotation of said rotatable member in a given direction at a predetermined speed.

3. In a vehicle direction indicator, a rotatable member having a plurality of apertures therein, a casing for said member and having an elongate, arcuate opening whereby each of said apertures is visible therethrough for a portion of its period of revolution, means for selectively rotating said disc in either direction, illuminating means located adjacent each end of said opening whereby when one of said illuminating means is active said opening will be most intensely illuminated at one end and when the other of said illuminating means is active said opening will be most intensely illuminated at its other end, the distribution of intensity of illumination cooperating with the directional rotation of said rotatable member to indicate an intention to turn in a given direction.

4. In a vehicle direction indicator, a rotatable disc having a plurality of circularly arranged apertures therein, a casing for said disc and having an arcuate opening whereby each of said apertures is visible therethrough for a portion of its cycle of revolution, the opposite terminal portions of said opening being shaped to simulate arrowheads, illuminating means located adjacent each of the terminal portions of said opening whereby when one of said illuminating means is active said opening will be most intensely illuminated adjacent the arrowhead at one end and when the other of said illuminating means is active said opening will be most intensely illuminated at its other end, the distribution of intensity of illumination cooperating with the directional rotation of said rotatable member to indicate an intention to turn in a given direction.

5. In a vehicle direction indicator, a rotatable disc having a plurality of circularly arranged apertures therein, a casing for said disc and having an arcuate opening whereby each of said apertures is visible therethrough for a portion of its cycle of revolution, means for selectively rotating said disc in opposite directions, illuminating means located adjacent one end of said arcuate opening and means for automatically activating the same when said disc is rotated in one direction, whereby said opening will be most intensely illuminated at the said end thereof, said illumination diminishing in intensity toward the other end of said opening, illuminating means at the opposite end of said opening and means for automatically activating the same when said disc is rotated in the opposite direction to produce a reverse effect when said disc is rotated in such opposite direction.

6. In a vehicle direction indicator, a rotatable member having a plurality of circularly arranged illuminable areas comprising a continuous row, means for rotating said member to warn observers of an intention to turn in an indicated direction, means for illuminating said illuminable areas, and automatic speed-responsive means for rendering said illuminating means operative upon rotation of said rotatable member above a predetermined velocity.

7. In a vehicle direction indicator, a rotatable disc having a plurality of illuminable areas comprising a continuous circularly extending row disposed to indicate direction, a casing for said disc and having an opening therein whereby a number of said areas comprising a finite arcuate row may be seen through said opening at a given time, and means for rotating said disc to warn observers of an intention to turn in the indicated direction, illuminating means adjacent an end of said opening and adapted to be activated upon rotation of said disc in a direction whereby the areas visible through said opening move toward said illuminating means, whereby the intensity of illumination of said areas will be greatest at said end of said opening and diminishing toward the opposite end thereof.

8. In a vehicle direction indicator, a rotatable member having a plurality of circularly arranged illuminable areas comprising a continuous row, fluid means for rotating said member to warn observers of an intention to turn in an indicated direction, means for illuminating said illuminable areas, and automatic speed-responsive means for rendering said illuminating means operative upon rotation of said rotatable member above a predetermined velocity.

ERWIN C. HORTON.